United States Patent [19]

Jones

[11] Patent Number: 4,641,499
[45] Date of Patent: Feb. 10, 1987

[54] TEN DEGREE KELVIN HYDRIDE REFRIGERATOR

[75] Inventor: Jack A. Jones, North Hollywood, Calif.

[73] Assignee: The United States of America as represented by the Administrator of the National Aeronautics and Space Administration, Washington, D.C.

[21] Appl. No.: 701,486

[22] Filed: Feb. 14, 1985

[51] Int. Cl.[4] ............................................. F17C 11/00
[52] U.S. Cl. ........................................ 62/48; 62/384; 62/514 R
[58] Field of Search ................... 62/514 R, 48, 384

[56] References Cited

U.S. PATENT DOCUMENTS

| | | | |
|---|---|---|---|
| 3,144,200 | 8/1964 | Taylor | 230/69 |
| 3,147,593 | 9/1964 | Garrett | 60/39.46 |
| 3,253,423 | 5/1966 | Sonnabend | 62/239 |
| 3,350,229 | 10/1967 | Justt | 62/48 |
| 3,366,680 | 1/1968 | Tward | 62/514 R |
| 3,545,226 | 12/1970 | Newell | 62/384 |
| 3,967,465 | 7/1976 | Asselman et al. | 62/48 |
| 4,111,002 | 9/1978 | Van Mal et al. | 62/514 R |
| 4,161,211 | 7/1979 | Duffy et al. | 62/48 |
| 4,178,987 | 12/1979 | Bowman et al. | 62/48 |
| 4,185,979 | 1/1980 | Woolley | 62/48 |
| 4,214,699 | 7/1980 | Buchner et al. | 62/48 |

Primary Examiner—Ronald C. Capossela
Attorney, Agent, or Firm—Paul F. McCaul; John Manning; Thomas H. Jones

[57] ABSTRACT

A compact hydride absorption refrigeration system with few moving parts for 10° Kelvin operation is disclosed and comprises liquid hydrogen producing means in combination with means for solidifying and subliming the liquid hydrogen produced. The liquid hydrogen is sublimed at about 10° Kelvin. By using a symmetrical all hydrogen redundant loop system, a 10° Kelvin refrigeration system can be operated for many years with only a fraction of the power required for prior art systems.

11 Claims, 1 Drawing Figure

TEN DEGREE KELVIN HYDRIDE REFRIGERATOR

BACKGROUND OF THE INVENTION

1. Origin of the Invention

The invention described herein was made in the performance of work under a NASA contract, and is subject to the provisions of public law 96-517 (35 USC 202) in which the contractor has elected to retain title.

2. Field of the Invention

This invention is directed to the field of cryogenics. In particular, this invention is directed to a low power hydride absorption refrigeration system which can operate with virtually no moving parts at 10° Kelvin for many years.

3. Description of the Prior Art

In some devices, such as infrared detectors for airborne and aerospace monitoring, mapping and imaging applications, there are components which must be cooled to about 10° Kelvin to properly operate. In many of those devices, the component must be continuously cooled for many years, for example, components in infrared detectors used in mapping satellites traveling to the outer planets. Prior art cryogenic systems for cooling to the 10° Kelvin temperature level include the use of excessively bulky expendable cryogenic fluids having maximum service lifetimes of about 12 months, and helium three-stage refrigerator systems having very large power requirements, many wear-related moving components, and complicated electrical equipment.

Hydrogen has previously been used as a cryogenic cooling media. See, for example, U.S. Pat. No. 3,144,200 to Taylor, U.S. Pat. No. 3,147,593 to Garrett and U.S. Pat. No. 3,253,423 to Sonnabend. Absorption refrigeration systems are also known. See, for example, U.S. Pat. No. 3,366,680 to Tward. Furthermore, liquid hydrogen absorption refrigeration systems are known for long term aerospace cooling applications in the range of about 20° to about 30° Kelvin. See J. A. Jones and P. M. Golben, Cryogenics Magazine, volume , pages, 1985. However such liquid hydrogen absorption refrigeration systems cannot be used to reach the desired 10° Kelvin cooling level because liquid hydrogen freezes at 13.8° Kelvin.

SUMMARY OF THE INVENTION

The present invention is directed to a compact hydride absorption refrigeration system having few moving parts and operational for many years at 10° Kelvin. The system includes means for producing liquid hydrogen from gaseous hydrogen, a liquid hydrogen container for containing the produced liquid hydrogen, and an absorption vessel containing a low pressure sorbent for absorbing gaseous hydrogen. When the pressure in the system is lowered by cooling the sorbent, the sorbent absorbs gaseous hydrogen from the liquid hydrogen container to thereby freeze the hydrogen at about 13.8° Kelvin. Continuous absorption causes sublimation of the frozen hydrogen mass at or below 10° Kelvin thereby providing cooling operation at about 10° Kelvin. When all of the hydrogen has been sublimated, the sorbent can be heated to liberate gaseous hydrogen for use by the liquid hydrogen producing means. The system is made continuous by providing a second symmetrical system which operates after the hydrogen in the liquid hydrogen container of the first system is completely sublimated and while the liquid hydrogen producing means of the first system is refilling the liquid hydrogen container of the first system. The only moving parts are long life check valves, and the low energy required to run the system can come from waste heat or solar energy.

BRIEF DESCRIPTION OF THE DRAWINGS

The present invention will be described with reference to the accompanying drawing, wherein.

DESCRIPTION OF THE PREFERRED EMBODIMENT

Figure 1:
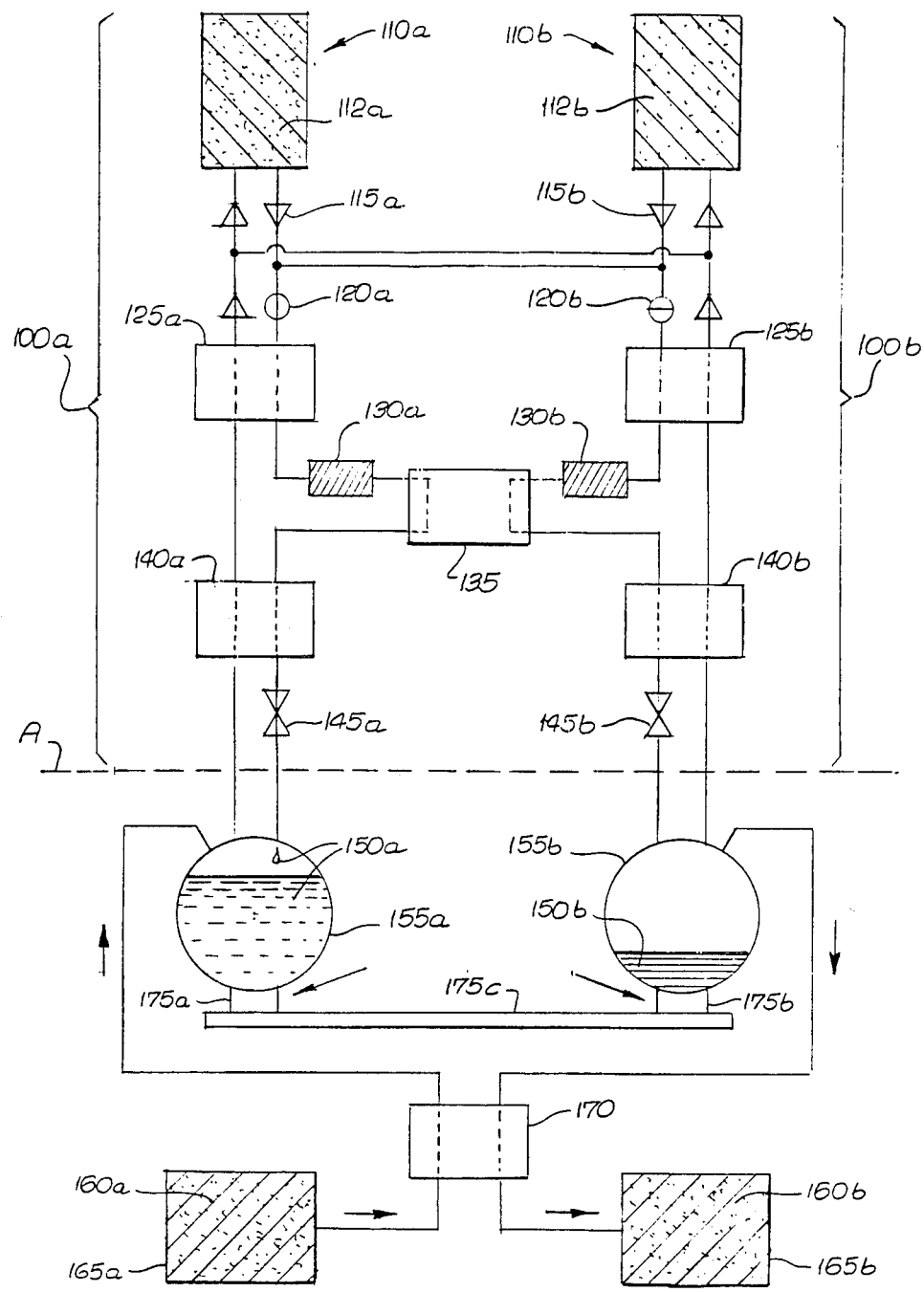
FIG. 1 is a schematic view of one embodiment of the refrigeration system of the present invention.

The following description is of the best presently contemplated mode of carrying out the invention. This description is made for the purpose of illustrating the general principles of the invention and is not to be taken in a limiting sense. The scope of the invention is best determined by the appended claims.

Referring to FIG. 1, one embodiment of the present invention is shown. In general, the present invention includes a symmetrical pair of liquid hydrogen producing means, generally 100a and 100b, which schematically are shown above the dashed line labeled A. It should be noted that the present invention contemplates the use of other liquid hydrogen producing means; however, only the preferred liquid hydrogen producing means is described below.

For purposes of simplicity due to the symmetry of the liquid hydrogen producing means 100a and 100b, only liquid hydrogen producing means 100a will be described in detail herein. The liquid hydrogen producing means includes first absorption vessel 110a which contains a powdered hydrogen sorbent 112a. Suitable sorbents are $LaNi_5$, zeolite, charcoal, and metal hydrides, with $LaNi_{4.7}Al_{0.3}$ hydride being preferred. It should be understood that the present invention contemplates the use of at least two first absorption vessels 110a and 110b; however, more than two may be interconnected on each liquid hydrogen producing means.

Connected to the first absorption vessel 110a is means for heating the sorbent within the absorption vessel (not shown) and means for cooling the sorbent within the absorption vessel (not shown). When the sorbent is cooled, the sorbent absorbs gaseous hydrogen. When a sorbent full of hydrogen is heated, the sorbent liberates gaseous hydrogen.

The heating means may comprise simple resistance heaters, and depending upon prevailing temperatures and heat transfer capability required in a given environment for the system, the heating means may constitute no more than thermal bridges coupled to sources of heat found to exist in the environment in which the system is employed, such as waste heat or solar heat. Similarly, the cooling means may be simple water coolers or space radiators depending upon the environment where the system is used.

As noted above, when the sorbent 112a in the first absorption vessel 110a is heated, hot high pressure hydrogen is liberated and passes through long life check valve 115a and through long life check valve (which is open) 120a into high temperature heat exchanger 125a. The hot high pressure gaseous hydrogen is typically about 450° Kelvin and about 40 to about 60 atmospheres before passing into the heat exchanger 125a. Preferably, the heat exchanger 125a consists of dual counterflow tubes; however, other heat exchanging means known in the art are within the scope of this invention. For example, natural air convection currents, or for space craft, a space radiator (either another refrigerator or a radiator facing the cold of deep space) may be used as a heat exchanger. As will be more fully understood below, one of the dual tubes contains hot high pressure gaseous hydrogen flowing away from first absorption vessel 110a and the other tube contains cooler low pressure gaseous hydrogen flowing towards the first absorption vessel 110a.

After passing through the high temperature heat exchanger 125a, the high pressure hydrogen (now about room temperature) passes through an ortho-para converter 130a which facilitates the conversion of ortho-hydrogen to para-hydrogen. Typically the ortho-para converter includes a catalyst for promoting the conversion, the catalysts being well known in the art.

The high pressure hydrogen gas then passes through a series of heat exchangers 135a and 140a which may be dual counterflow tubes, a deep space cold radiator or liquid nitrogen. The low temperature heat exchanger 140a preferably consists of dual counterflow tubes. It should be appreciated that more heat exchangers can be provided.

Thereafter, the high pressure hydrogen gas (preferably at about 30° K.) passes through a Joule-Thomson expansion valve 145a where expansion of the hydrogen gas causes the production of liquid hydrogen 150a which is contained in liquid hydrogen container 155a. At this point, the liquid hydrogen is at about 20° Kelvin. It can now be appreciated why an ortho-para converter is provided, because if the liquid hydrogen 150a is kept within the liquid hydrogen container 155a for a long period of time, some of the ortho-hydrogen will convert to para-hydrogen thereby generating heat. By converting most of the ortho to para before liquefaction, this undesirable source of heat will be minimized.

After the liquid hydrogen container 155a is filled with liquid hydrogen, the valve 120a is closed. After the valve 120a is closed, and low pressure sorbent 160a contained within a second absorption vessel 165a is cooled. The low pressure sorbent 160a is characterized by its ability to absorb gaseous hydrogen at very low pressures, for example, less than 2 torr. Also, the absorption should occur when the temperature of the second absorption vessel is around room temperature or above. Powdered $Mg_2Ni$ and preferably palladium are low pressure sorbents which can be used, but others are within the scope of the present invention so long as they are able to absorb hydrogen gas at very low pressure, that is, about 1/400th of an atmosphere with the temperature of the absorption vessel being maintained at room temperature or above. Powdered palladium is preferred since powdered $Mg_2Ni$ tends to break down after cycling; whereas, palladium does not appear to break down after many years of use. Further, if $Mg_2Ni$ is used, it should be cooled to about 377° K. and if palladium is used, it should be cooled to lower than 377° K. and preferably about room temperature.

As the temperature of the sorbent 160a is lowered, for example, to about 377° Kelvin for $Mg_2Ni$, the ambient pressure within the liquid hydrogen container 155a is reduced to about 1.7 torr. As the pressure is reduced, the liquid hydrogen 150a in the liquid hydrogen container 155a is cooled to below 13.8° Kelvin, the freezing point of hydrogen, where it stabilizes at below 10° Kelvin as a solid hydrogen mass. Further absorption by the low pressure sorbent 160a causes sublimation of the solid hydrogen mass at temperatures as low as 7° Kelvin, which can adquately provide cooling down to about 10° Kelvin. It should be noted that solid hydrogen can also be produced by direct expansion of hydrogen through a Joule-Thomson valve to produce solid hydrogen "snow".

It should be appreciated that as the sublimated hydrogen gas passes into the second absorption vessel 165a, it passes through a dual counterflow heat exchanger 170 and thereby precools higher pressure gas which is being added back to the system by heating the second vessel 165b as discussed further below. Also, after complete sublimation of the solid hydrogen mass, the 10° Kelvin refrigeration cycle continues with the solid hydrogen 150b being sublimed from the other liquid hydrogen container 155b which had been filled with liquid hydrogen while the hydrogen in the liquid hydrogen container 155a was being sublimated.

After the sorbent 165a has absorbed the hydrogen from the liquid hydrogen container 155a, heating means (not shown) connected to the second absorption vessel 165a and cooling means connected to the absorption vessel 110b are activated to thereby cause the liberation of gaseous hydrogen from the sorbent 160a, which passes through the system conduits eventually being absorbed by the sorbent 112b in absorption vessel 110b.

Only a small temperature change is necessary to liberate the hydrogen from the sorbent 160a, preferably that sufficient to cause a hydrogen phase change. Thus waste heat or solar energy can be used as a heat source to liberate the hydrogen. The liberated hydrogen passes through the heat exchanger 170 (as discussed previously), and into the liquid hydrogen container 155a (which had previously been emptied by sublimation). Due to the heat exchanger 170, some of the hydrogen being liberated is liquid and drops into the liquid hydrogen container 155a, the balance of the gaseous hydrogen passing toward the first absorption vessel 110b which is being cooled. In moving towards the first absorption vessel 110b, the gaseous hydrogen passes through the heat exchangers 140a, 135 and 125a thereby cooling high pressure hydrogen which is flowing away from the first absorption vessels 110a.

It should be appreciated that as one of the liquid hydrogen containers is being filled with liquid hydrogen, the hydrogen contained in the other liquid hydrogen container is being sublimated by the sorbent in one of the second absorption vessels. Thus as one of the absorption vessels is being cooled to cause sublimation of hydrogen, the other of the absorption vessels is being heated to cause liberation of gaseous hydrogen.

The valves 120a and 120b are alternatively opened and closed as discussed above in response to a thermal switch. The thermal switch may, for example, comprise a thin gold-plated gap 175a and 175b between temperature sensor 175c and the liquid hydrogen containers 155a and 155b. For thermal switch activation, a very small amount of gas, such as hydrogen from another hydride container, can pass into the gap 175a and will allow conduction to the temperature sensor 175c. For deactivation, the gap is evacuated so that very little heat will pass across the gap.

Typical cycle times for the refrigeration system are fairly lengthy; for example, a quantity of about 120 grams of solid hydrogen with 100 mW of cooling at about 10° Kelvin may require one week for complete sublimation after solidification. The system advantageously has no moving parts except for the essential valve movement described in the long life valves. Therefore the system can be expected not to require service over a long multi-year period. It should be appreciated that the system is powered entirely by low temperature heat and thus can be operated by solar heating means, or low temperature waste heat sources instead of electrical energy heating. The system may require less than 10% additional power to pass from 20° Kelvin to 10° Kelvin; whereas, in conventional helium three stage refrigeration systems, 100% (or greater factor) of additional power is required to achieve the same cooling.

I claim:

1. A refrigeration system for operation at temperatures lower than 20 degrees Kelvin, the system comprising:
   liquefying means for producing a volume of liquid hydrogen from gaseous hydrogen;
   a liquid hydrogen container for containing the volume of liquid hydrogen produced by the liquefying means;
   an absorption vessel containing a chemical sorbent which absorbs gaseous hydrogen, the absorption vessel communicating with the liquid hydrogen container; and
   cooling means for cooling the sorbent,
   wherein when the cooling means is activated, the sorbent absorbs gaseous hydrogen from the liquid hydrogen container to thereby freeze the hydrogen contained therein and thereafter sublime the frozen hydrogen.

2. A refrigeration system according to claim 1 wherein there is a sufficient mass of sorbent in the absorption vessel to absorb the volume of liquid hydrogen contained within the liquid hydrogen container.

3. A refrigeration system according to claim 1 further including heating means for heating the absorption vessel, wherein the heating means is activated after the sorbent has absorbed essentially all of the hydrogen contained within the liquid hydrogen container and wherein operation of the heating means causes liberation of gaseous hydrogen from the absorption vessel, the liberated gaseous hydrogen passing to the liquefying means.

4. A refrigeration system according to claim 1 wherein the sorbent is $Mg_2Ni$.

5. A refrigeration system according to claim 1 wherein the sorbent is palladium.

6. A refrigeration system according to claim 1 wherein the cooling means operates to cool the sorbent within the absorption vessel primarily by using liquid water.

7. A hydride absorption refrigeration system for operation at about 10 degrees Kelvin, the system comprising:
   a liquid hydrogen container containing liquid hydrogen;
   an absorption vessel containing a chemical sorbent which absorbs gaseous hydrogen, the absorption vessel communicating with the liquid hydrogen container; and
   means for cooling the sorbent so that the pressure within the system is reduced to less than 2 torr.

8. A refrigeration system according to claim 7 wherein the sorbent is selected from the group consisting of powdered $Mg_2Ni$ and powdered palladium.

9. A hydride absorption refrigeration system comprising:
   a pair of first absorption vessels, each first absorption vessel containing a first chemical sorbent for absorbing gaseous hydrogen;
   heating means for heating each of the first absorption vessels to thereby cause the liberation of high pressure gaseous hydrogen absorbed by the first chemical sorbent;
   cooling means for cooling each of the first absorption vessels to thereby cause the absorption of gaseous hydrogen by the first chemical sorbent;
   an expansion valve for liquefying the high pressure gaseous hydrogen liberated from the first chemical sorbent;
   a pair of liquid hydrogen containers for containing liquid hydrogen produced by operation of the expansion valve;
   a pair of second absorption vessels, each of the second absorption vessels containing a second chemical sorbent for absorbing gaseous hydrogen, one of each of the second absorption vessels communicating with one of each of the liquid hydrogen containers;
   cooling means for cooling the second chemical sorbent so that the sorbent causes the solidification and sublimation of liquid hydrogen contained within one of the liquid hydrogen containers; and
   heating means for heating the second chemical sorbent.

10. A hydride absorption refrigeration system according to claim 9 wherein the second chemical sorbent is selected from the group consisting of $Mg_2Ni$ and palladium.

11. A hydride absorption refrigeration according to claim 9 wherein there is provided a conduit for communicating a first absorption vessel with a second absorption vessel, wherein the hydrogen liberated from said second absorption vessel passes into said first absorption vessel for subsequent absorption by the first chemical sorbent within said first absorption vessel.

* * * * *